(12) United States Patent
Hama et al.

(10) Patent No.: US 8,787,624 B2
(45) Date of Patent: Jul. 22, 2014

(54) BIOMETRIC-INFORMATION PROCESSING DEVICE, METHOD OF PROCESSING BIOMETRIC INFORMATION, AND COMPUTER-READABLE RECORDING MEDIUM STORING BIOMETRIC-INFORMATION PROCESSING PROGRAM

(75) Inventors: Soichi Hama, Kawasaki (JP); Mitsuaki Fukuda, Kawasaki (JP); Takahiro Aoki, Kawasaki (JP); Yuka Jo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 56 days.

(21) Appl. No.: 13/401,247

(22) Filed: Feb. 21, 2012

(65) Prior Publication Data

US 2012/0230551 A1    Sep. 13, 2012

(30) Foreign Application Priority Data

Mar. 8, 2011   (JP) ................. 2011-050783

(51) Int. Cl.
*G06K 9/00*   (2006.01)
*G06K 9/03*   (2006.01)

(52) U.S. Cl.
CPC ............ *G06K 9/00033* (2013.01); *G06K 9/036* (2013.01)
USPC ........................................ 382/115

(58) Field of Classification Search
None
See application file for complete search history.

(56) References Cited

U.S. PATENT DOCUMENTS

| 6,088,470 | A | 7/2000 | Camus et al. | |
|---|---|---|---|---|
| 6,301,375 | B1 | 10/2001 | Choi | |
| 2004/0201586 | A1 | 10/2004 | Marschner et al. | |
| 2008/0095463 | A1 | 4/2008 | Abe | |
| 2011/0007951 | A1 | 1/2011 | Mil'shtein et al. | |
| 2012/0307031 | A1 * | 12/2012 | Aoki | 348/77 |
| 2013/0308834 | A1 * | 11/2013 | Suzuki et al. | 382/115 |

FOREIGN PATENT DOCUMENTS

| EP | 1857963 | | 11/2007 |
|---|---|---|---|
| EP | 1857963 | A1 * | 11/2007 |
| EP | 2148295 | | 1/2010 |
| JP | 10-295674 | | 11/1998 |
| JP | 2001-224549 | | 8/2001 |
| JP | 2002-501265 | | 1/2002 |
| JP | 2002-112970 | | 4/2002 |
| JP | 2002-133446 | | 5/2002 |
| JP | 2002-514098 | | 5/2002 |
| JP | 2002-200050 | | 7/2002 |
| JP | 2005-168627 | | 6/2005 |
| JP | 2006-098340 | | 4/2006 |

(Continued)

OTHER PUBLICATIONS

Lee et al., "New Finger Biometric Method Using Near Infrared Imaging," Feb. 2011, Sensors (11): p. 2319-2333.*

(Continued)

*Primary Examiner* — Vu Le
*Assistant Examiner* — Samah Beg
(74) *Attorney, Agent, or Firm* — Staas & Halsey LLP

(57) ABSTRACT

A biometric-information processing device includes an image acquisition unit configured to acquire an image of a biometric object using light reflected from the biometric object. The biometric-information processing device further includes an extracting unit configured to extract a frequency component having a frequency higher than a predetermined spatial frequency at the image acquired by the image acquisition unit.

16 Claims, 10 Drawing Sheets

(56) References Cited

FOREIGN PATENT DOCUMENTS

| JP | 2007-219624 | 8/2007 |
|---|---|---|
| JP | 2008-109952 | 5/2008 |
| JP | 2010-244304 | 10/2010 |
| WO | WO 98/08439 | 3/1998 |

OTHER PUBLICATIONS

Zhang et al., "A Palm Vein Recognition System," 2010, IEEE International Conference on Intelligent Computation Technology and Automation: p. 285-288.*

Extended European Search Report dated Apr. 26, 2012 issued in corresponding European Patent Application No. 12156830.7.

Rihards Fuksis et al., "Processing of Palm Print and Blood Vessel Images for Multimodal Biometrics", Lecture Notes in Computer Science, vol. 6583, Mar. 2011, pp. 238-249.

Eui Chul Lee et al., "New Finger Biometric Method Using Near Infrared Imaging", Sensors, Vo. 11, No. 24, Feb. 2011, pp. 2319-2333.

European Office Action issued Sep. 25, 2013 in corresponding European Patent Application No. 12 156 830.7.

Amioy Kumar, Tanvir Singh, and Ajay Kumar, "Hand Anatomy," pp. 1-11, *Biometrics Research Laboratory, Department of Electrical Engineering, Indian Institute of Technology Dehli*, New Dehli, India, 2009.

Åke Nyström, Jan Fridén, Graham D. Lister, "Superficial Venous Anatomy of the Human Palm," pp. 121-127, *Plastic Reconstructive Hand Surgery*, 24, 1990.

L. Wang, G. Leedham and S.-Y. Cho, "Infrared Imaging of Hand Vein Patterns for Biometric Purposes," pp. 113-122, *IET Computer Vision*, vol. 1, issues 3-4, 2007.

John R. Vacca, "*How Vein Pattern Recognition Works*," pp. 195-201, "Biometric Technologies and Verification Systems," Chapter 16, Elsevier Inc, 2007.

Japanese Office Action dated May 27, 2014 in Japanese Application No. 2011-050783.

* cited by examiner

FIG. 4A
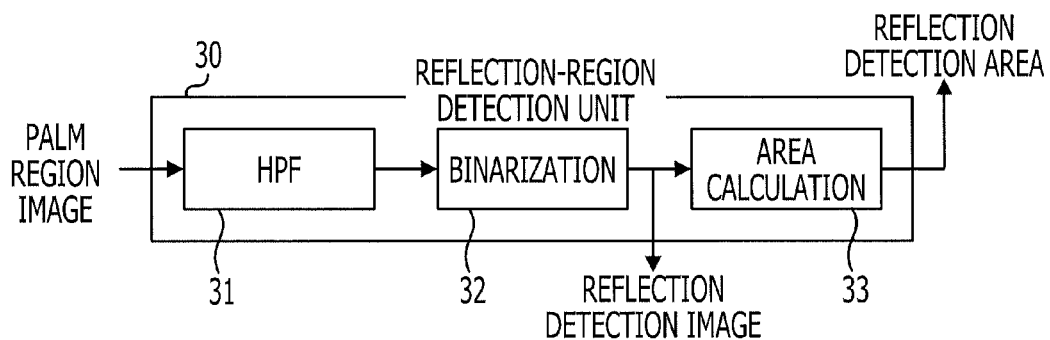
FIG. 4B     FIG. 4C     FIG. 4D
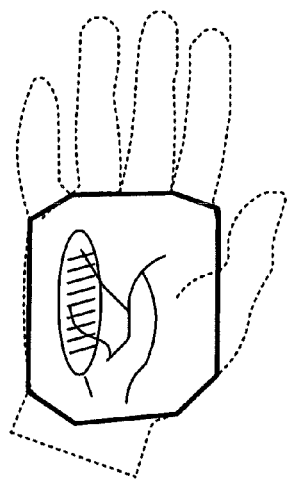   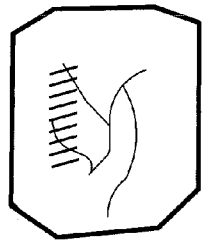   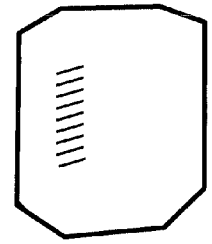
FIG. 4E
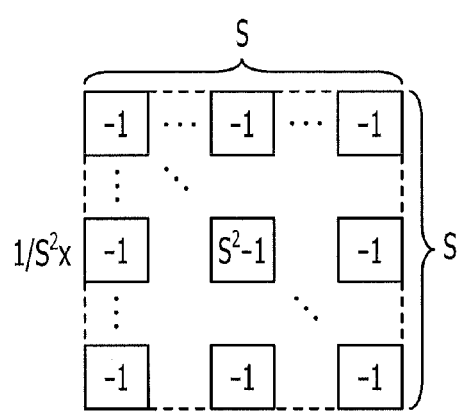

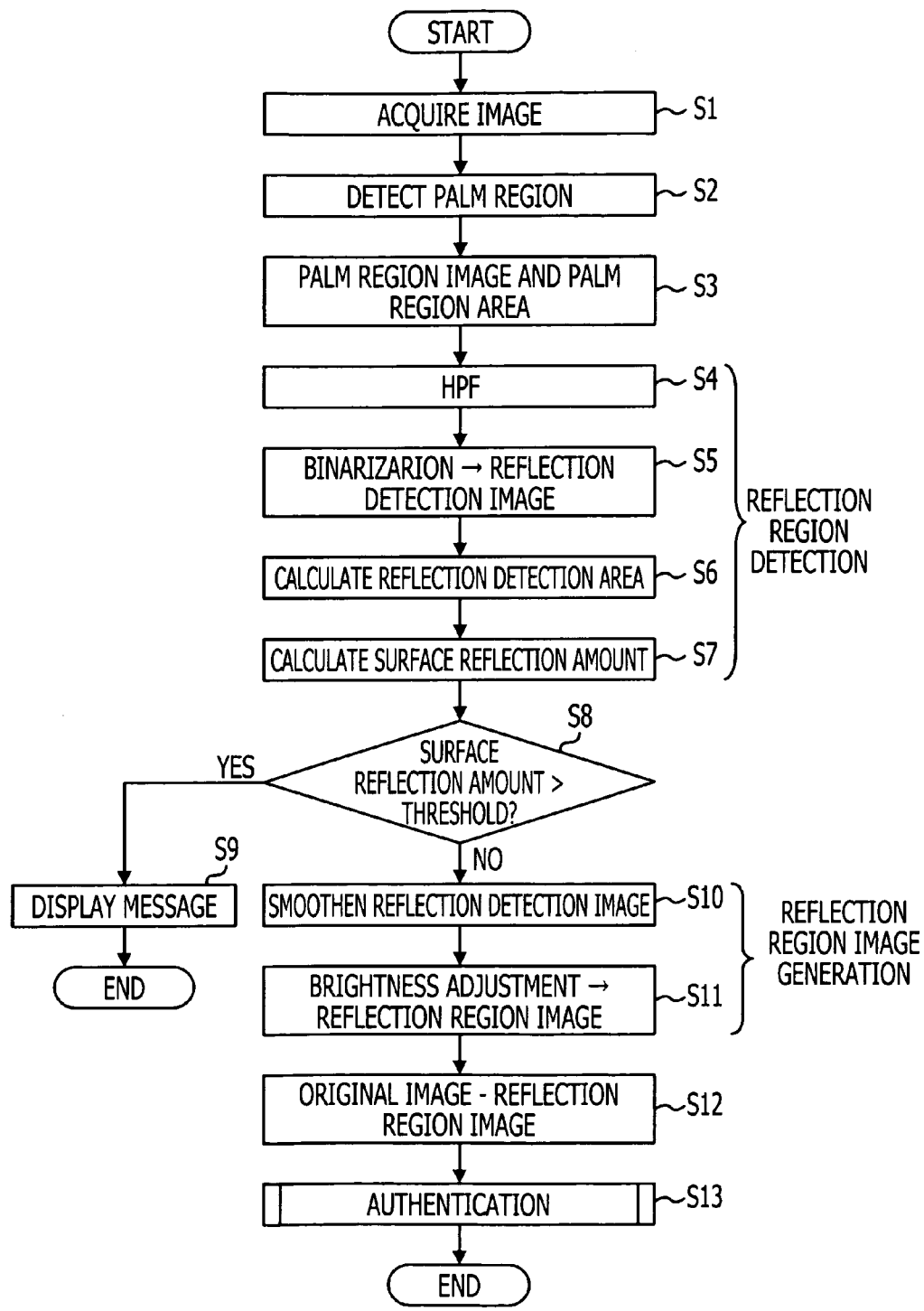

BIOMETRIC-INFORMATION PROCESSING DEVICE, METHOD OF PROCESSING BIOMETRIC INFORMATION, AND COMPUTER-READABLE RECORDING MEDIUM STORING BIOMETRIC-INFORMATION PROCESSING PROGRAM

CROSS-REFERENCE TO RELATED APPLICATION

This application is based upon and claims the benefit of priority of the prior Japanese Patent Application No. 2011-50783, filed on Mar. 8, 2011, the entire contents of which are incorporated herein by reference.

FIELD

The embodiments discussed herein are related to a biometric-information processing device, a method of processing biometric information, and a biometric-information processing program.

BACKGROUND

Known methods of acquiring an image of a biometric object for biometric authentication include methods using transmitted light and methods using reflected light. To acquire an image of a biological object located under the skin, such as a vein, diffused light, among the reflected light, that is reflected back after being diffused inside the hand is used. In such a case, surface reflected light that reflects at the skin becomes noise. When the surface reflected light and the diffused light are superimposed, detection of the biological object becomes difficult.

Japanese Laid-open Patent Publications Nos. 2002-112970 and 2002-200050 disclose techniques using polarized illumination. Japanese National Publications of International Patent Application Nos. 2002-501265 and 2002-514098 and Japanese Laid-open Patent Publication No. 2002-133446 disclose techniques using a plurality of lights for acquiring an image with each light. Japanese Laid-open Patent Publication No. 2001-224549 discloses a technique for acquiring a reflection image by processing an image through a low-pass filter.

SUMMARY

According to an aspect of the embodiments, a biometric-information processing device includes an image acquisition unit configured to acquire an image of a biological object using light reflected from the biometric object; and an extracting unit configured to extract a frequency component having a frequency higher than a predetermined spatial frequency at the image acquired by the image acquisition unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 4A is a block diagram illustrating details of a reflection-region detection unit; FIGS. 4B, 4C, and 4D are schematic views of images in different processing operations carried out by the reflection-region detection unit; and FIG. 4E illustrates a high-pass filter;

FIG. 6 is a flow chart illustrating example processing carried out by the biometric-information processing device through the execution of the biometric-information processing program;

DESCRIPTION OF EMBODIMENTS

Figure 1A:
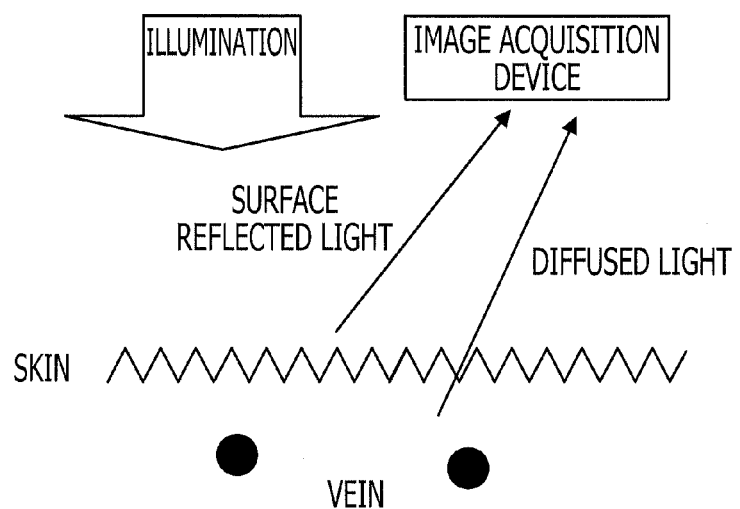
FIGS. 1A and 1B are schematic views of vein authentication.
Figure 1B:
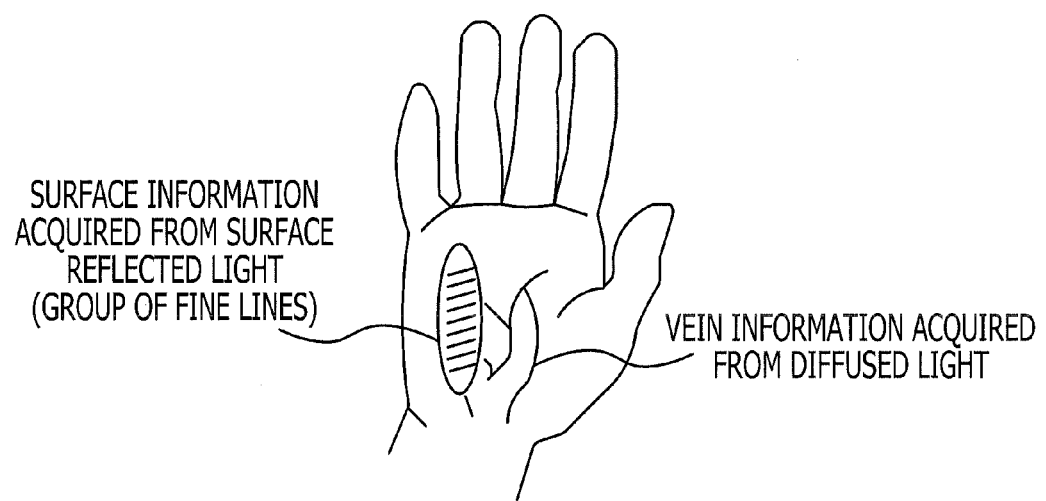

Before describing the embodiments, biometric authentication using reflected light will be described. Vein authentication will be described as an example. Vein authentication is an authentication method of verification using vein images acquired by an image acquisition device. FIGS. 1A and 1B are schematic views of vein authentication. Illumination may be provided, as illustrated in FIG. 1A, to enable image acquisition regardless of the presence of other light sources. In such a case, the illumination device and the image acquisition device are disposed on the same side of the biometric object. Since hemoglobin in blood has a characteristic of absorbing near infrared light, a vein image may be acquired by illuminating a human palm with near infrared light.

When light emitted from the light source and incident on the palm is reflected, the light is separated into surface reflected light that is reflected at the surface of the palm and diffused light that returns after being diffused inside the hand. Since veins are positioned under the skin, vein information is contained in the diffused light. Thus, the image acquisition device acquires a vein image using the diffused light. Since vein information is not contained in the surface reflected light, the surface reflected light is noise.

As illustrated in FIG. 1B, veins are difficult to detect in regions where the surface reflected light and the diffused light are superimposed because the surface reflected light includes a group of fine lines. With an image acquisition method that simultaneously detects surface reflected light and diffused light, it is desirable that the influence of surface reflected light is suppressed. If the influence of the surface reflected light may be suppressed, authentication accuracy improves.

Surface reflection occurs in a region of the palm that has a certain area and depends on the shape of the palm. Surface reflected light reflects the wrinkles, palm print, etc. of the surface of the palm. Since the palm surface structure is finer than the vein structure, the spatial frequency of the palm surface structure is higher in the acquired image. That is, in the image acquired by the image acquisition device, the region including high-frequency components of the spatial frequency components is a region in which the surface reflected light is superimposed. In the embodiments described below, authentication accuracy is improved by using extracted high-frequency components. By using such a technique, the size and cost of the biometric-information processing device may be reduced.

Figure 2A:
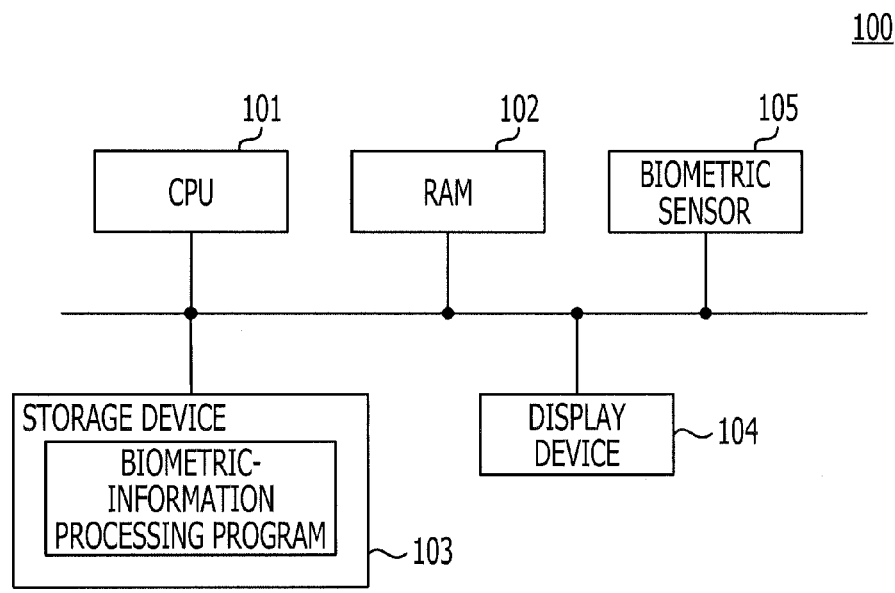
FIG. 2A is a block diagram illustrating the hardware configuration of a biometric-information processing device according to a first embodiment.
Figure 2B:
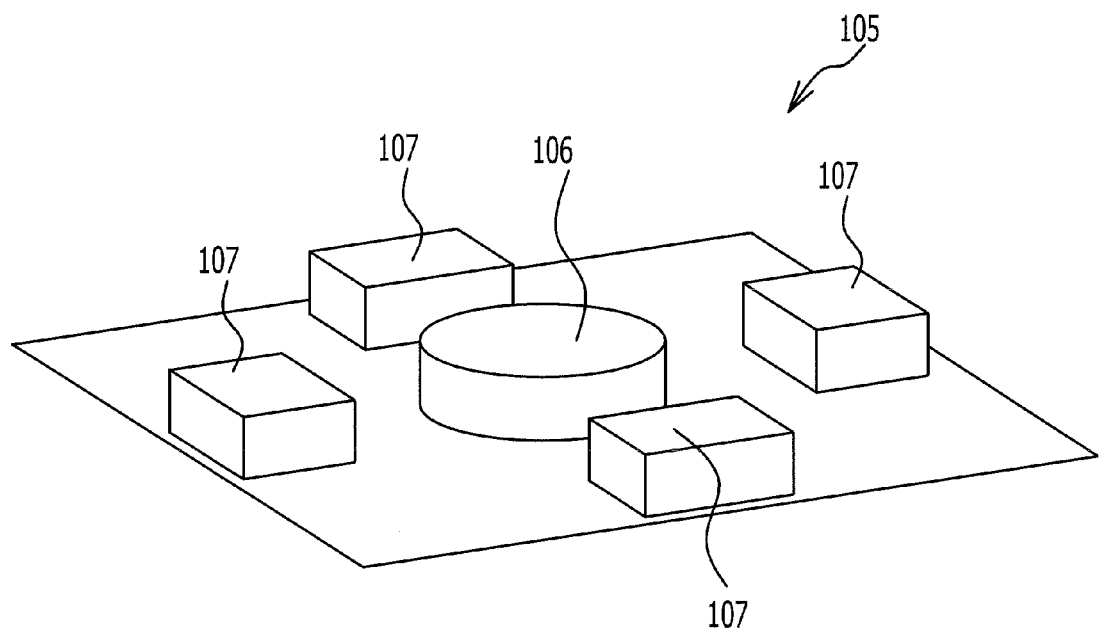
FIG. 2B is a schematic perspective view of a biometric sensor.

A first embodiment will be described below. FIG. 2A is a block diagram illustrating the hardware configuration of a biometric-information processing device 100 according to the first embodiment. FIG. 2B is a schematic perspective view of a biometric sensor 105, which is described below. As illustrated in FIG. 2A, the biometric-information processing device 100 includes a central processing unit (CPU) 101, a random access memory (RAM) 102, a storage device 103, a display device 104, and the biometric sensor 105. These components are connected via a bus, etc.

The CPU 101 is a central processing unit having at least one core. The RAM 102 is a volatile memory in which programs to be executed by the CPU 101, data processed by the CPU 101, etc. are temporarily stored.

The storage device 103 is a non-volatile storage device. The storage device 103 is, for example, a read only memory (ROM), a solid state drive (SSD), such as a flash memory, or a hard disc driven by a hard disc drive. The biometric-information processing program according to this embodiment is stored in the storage device 103. The display device 104 is, for example, a liquid crystal display or an electroluminescent panel, and displays results of biometric information processing.

The biometric sensor 105 is a sensor that detects a user's biometric information in an acquired biometric image. In this embodiment, the biometric sensor 105 detects biometric information using reflected light. Light reflected at a biometric object in this embodiment contains biometric information. For example, a biometric object may be a vein. In this embodiment, as an example, the biometric sensor 105 detects veins in a human palm.

As illustrated in FIG. 2B, the biometric sensor 105 includes an image acquisition unit 106 and light-emitting units 107. The image acquisition unit 106 is not particularly limited so long as biometric images may be acquired. The light-emitting units 107 are not particularly limited so long as light containing near infrared rays may be emitted. A plurality of light-emitting units 107 may be provided. In FIG. 2B, four light-emitting units 107 surround the image acquisition unit 106.

The biometric-information processing program stored in the storage device 103 is expanded in the RAM 102 in an executable manner. The CPU 101 executes the biometric-information processing program expanded in the RAM 102. In this way, various types of processing are carried out by the biometric-information processing device 100.

Figure 3:
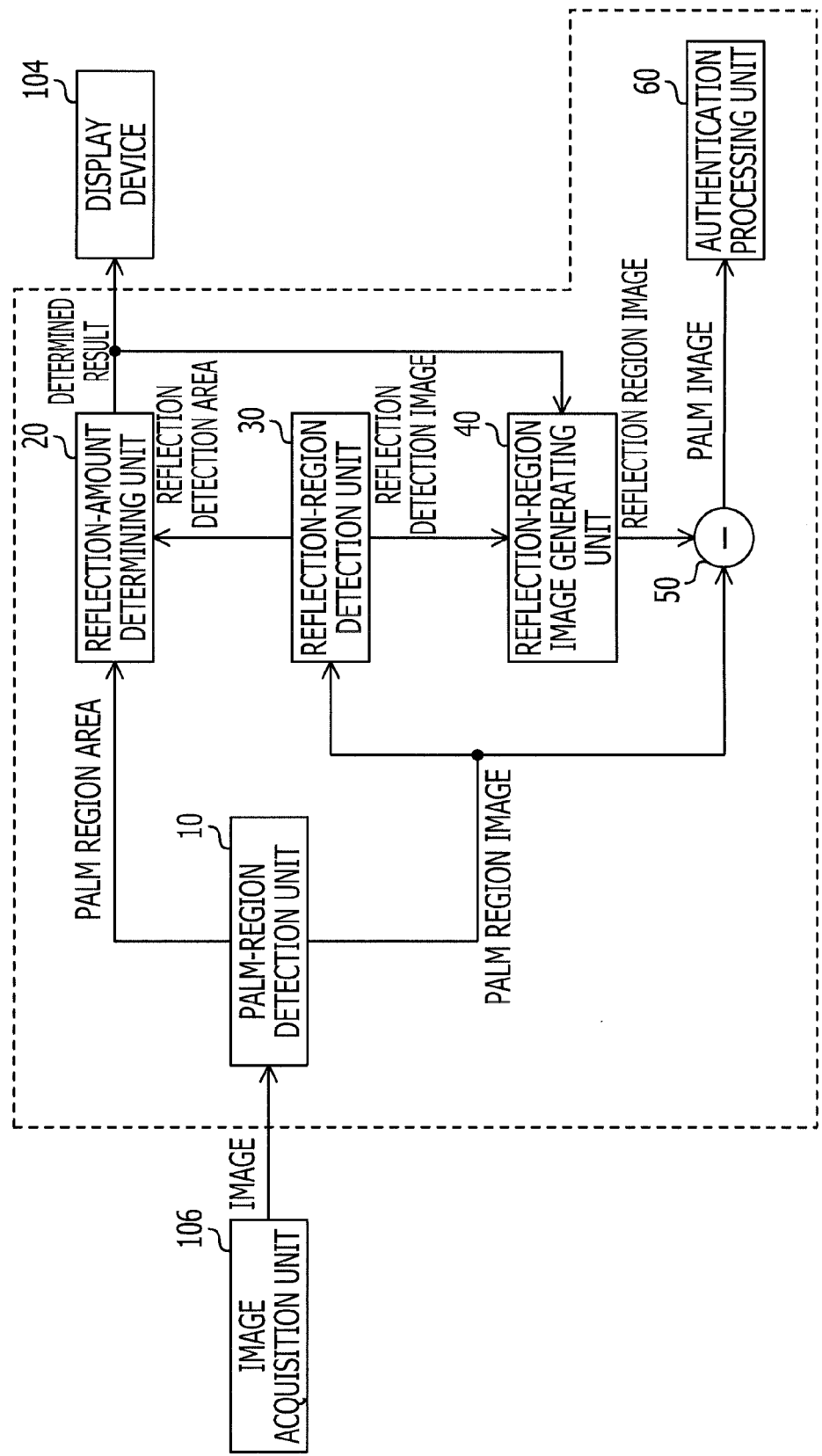
FIG. 3 is a block diagram illustrating the functions realized by the execution of a biometric-information processing program.

FIG. 3 is a block diagram illustrating the functions realized by the execution of the biometric-information processing program. As illustrated in FIG. 3, by executing the biometric-information processing program, the following components are realized: a palm-region detection unit 10, a reflection-amount determining unit 20, a reflection-region detection unit 30, a biometric-information-processing unit 40, an image processing unit 50, and an authentication processing unit 60.

An image acquired by the image acquisition unit 106 is sent to the palm-region detection unit 10. The palm-region detection unit 10 defines a palm region in the acquired image to define a palm region image and determine the area of a palm region. The palm region is a region corresponding to the hand, excluding the fingers and arm. The palm-region detection unit 10 sends the palm region area to the reflection-amount determining unit 20 and sends the palm region image to the reflection-region detection unit 30 and the image processing unit 50.

FIG. 4A is a block diagram illustrating details of the reflection-region detection unit 30. As illustrated in FIG. 4A, the reflection-region detection unit 30 includes a high-pass filter 31, a binarizing unit 32, and an area calculating unit 33. FIGS. 4B, 4C, and 4D are schematic views of images in different processing operations carried out by the reflection-region detection unit 30. FIG. 4E illustrates the high-pass filter 31.

As illustrated in FIG. 4B, the palm region image includes vein components acquired from the diffused light and surface reflection components acquired from the surface reflected light. The surface reflection components correspond to a collection of fine lines. In FIG. 4B, the fingers and arm are represented by dotted lines. The fingers and arm represented by dotted lines are not included in the palm region image.

The high-pass filter 31 functions as an extracting unit that extracts, from the palm region image, frequency components with a frequency higher than a predetermined spatial frequency. As illustrated in FIG. 4E, an S×S matrix may be used as the high-pass filter 31. By increasing the value S, the extraction frequency is lowered. In this embodiment, the extraction frequency of the high-pass filter 31 is set higher than the extraction frequency of vein components and is set sufficiently lower than the extraction frequency of surface reflection components. The extraction frequency of the high-pass filter 31 may be set in consideration of the angle of view of the original image.

FIG. 4C illustrates extracted high-frequency components. Through extraction of high-frequency components, surface reflection components are mainly extracted from the surface reflected light. Thus, the surface reflection components and the vein components may be separated. In this embodiment, the binarizing unit 32 is used to clearly separate the surface reflection components and the vein components. The high-pass filter 31 sends the extracted high-frequency components to the binarizing unit 32.

The binarizing unit 32 uses a predetermined threshold to binarize (separate into "1" and "0") the high-frequency components sent from the high-pass filter 31. If the threshold is significantly low (near zero), image noise may be falsely detected; therefore, it is desirable that the threshold be set on the basis of brightness amplitude of the fine surface structure. The brightness amplitude of the surface structure depends on the reflection at the biometric object or image-acquisition conditions, such as exposure time and gain. Through binarization, the components may be separated into components in the positive direction (direction of brighter) and the components in the negative direction (direction of darker). Since the surface reflection components are components in the positive direction and the vein components are components in the negative direction, the surface reflection components and the vein components are even more clearly separated. FIG. 4D illustrates binarized high-frequency components. By binarizing the high-frequency components, the surface reflection components are clearly extracted.

The binarized image, which is a reflection detection image, is sent to the biometric-information-processing unit 40 and the area calculating unit 33. The area calculating unit 33 calculates the area of the region corresponding to the surface reflection components (area of regions in which surface reflected light is detected) in the reflection detection image and sends the calculated area, which is the reflection detection area, to the reflection-amount determining unit 20. The reflection-amount determining unit 20 calculates the surface reflection amount from the palm region area and the reflection detection area. The surface reflection amount is the ratio of the area of the region in which surface reflection is detected to the area of the entire palm to be authenticated. Thus, the surface reflection amount may be represented by Equation 1. If the influence of the surface reflection is large in the image acquired by the image acquisition unit 106, the surface reflection amount increases. In contrast, if the influence of surface reflection is small in the image acquired by the image acquisition unit 106, the surface reflection amount decreases. Thus, the surface reflection amount may be used as an index value of the surface reflection components.

$$\text{surface reflection amount} = (\text{reflection detection area}) / (\text{palm region area}) \quad (1)$$

The reflection-amount determining unit 20 determines whether the calculated surface reflection amount is greater than a predetermined threshold. When the surface reflection amount is greater than a threshold, it may be determined that the influence of the surface reflected light is great. When the surface reflection amount is smaller than the threshold, it may be determined that the influence of surface reflection is small. In such a case, the threshold may be set in accordance with, for example, the bandwidth of the high-pass filter 31 or the threshold for the binarizing unit 32. For example, a percentage in the range of several percent to ten and several percent may be set as the threshold for the surface reflection amount.

The reflection-amount determining unit 20 sends the determined result to the display device 104 and the biometric-information-processing unit 40. The display device 104 displays the determined result. For example, if the surface reflection amount is great, the surface reflection components may influence the biometric authentication. Hence, the display device 104 may display a warning when the surface reflection amount is great. In such a case, biometric authentication may not be carried out.

If the surface reflection amount is small, the biometric-information-processing unit 40 generates a reflection region image. The reflection detection image is acquired by detecting the surface reflection caused by the fine structures of the surface of the palm. Surface reflection occurs at predetermined regions depending on the unevenness of the palm. Thus, by using the high-pass filter 31, the brightness of the periphery of the region in which surface reflection is detected also has high brightness. The biometric-information-processing unit 40 lowers the brightness of the reflection detection region to reduce the influence of surface reflection.

Figure 5A:
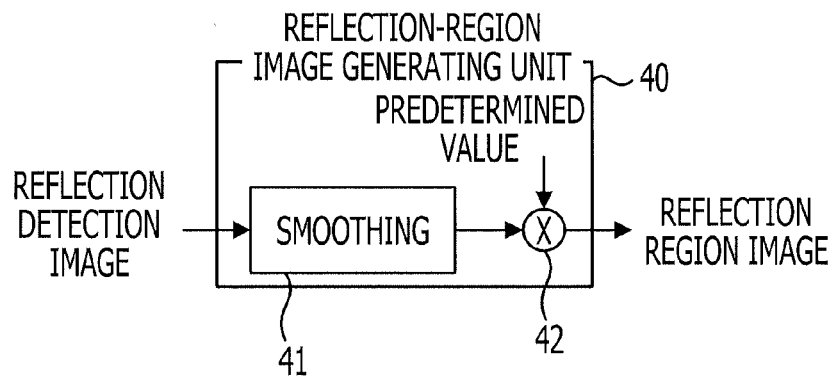
FIG. 5A is a block diagram illustrating the details of a reflection-region-image generating unit.
Figure 5B:
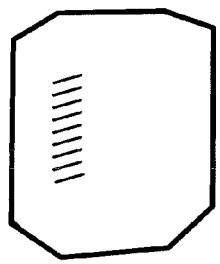
FIGS. 5B, 5C, and 5D are schematic views of images in different processing operations carried out by the reflection-region-image generating unit and an image processing unit.
Figure 5C:
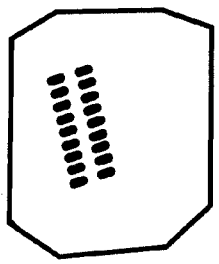
Figure 5D:
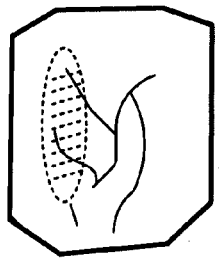

FIG. 5A is a block diagram illustrating the details of the biometric-information-processing unit 40. As illustrated in FIG. 5A, the biometric-information-processing unit 40 includes a smoothing unit 41 and a multiplying unit 42. FIGS. 5B, 5C, and 5D are schematic views of images in different processing operations carried out by the biometric-information-processing unit 40 and the image processing unit 50.

As illustrated in FIG. 5B, the binarized reflection detection image is sent to the smoothing unit 41. The smoothing unit 41 performs smoothing on the reflection detection image. Here, "smoothing" is the process of averaging the fine surface structure and the periphery. Accordingly, a low-pass filter set to a frequency lower than that of the palm surface structure may be used as the smoothing unit 41. FIG. 5C illustrates a smoothened reflection detection image.

The multiplying unit 42 multiplies the smoothened reflection detection image by a predetermined value. The predetermined value is set to compensate for the brightness amplitude information lost through binarization. For example, if the peak amplitude attenuates to ½ through smoothing by the smoothing unit 41, the predetermined value may be set as: predetermined value=(threshold of binarization×2). Since the original reflection amplitude is not uniform, the predetermined value may be adjusted in accordance with image acquisition conditions, etc. The multiplying unit 42 outputs the reflection detection image multiplied by the predetermined value to the image processing unit 50 as a reflection region image.

The image processing unit 50 subtracts the reflection region image generated by the biometric-information-processing unit 40 from the palm region image acquired by the palm-region detection unit 10. In this way, the brightness of the palm region image is corrected. Specifically, since the reflection region image represents only parts standing out due to reflection, by subtracting the reflection region image from the palm region image, a palm image that is less influenced by the surface reflection is acquired. FIG. 5D illustrates the acquired palm image. As illustrated in FIG. 5D, the influence of surface reflection on the palm region image, which is illustrated in FIG. 4B, is reduced. The image processing unit 50 sends the palm image to the authentication processing unit 60. The authentication processing unit 60 carries out authentication using the palm image sent from the image processing unit 50. Authentication includes verification for determining whether the verification data corresponding to characteristic values extracted from the palm image and the registered data registered in advance are similar or match.

FIG. 6 is a flow chart illustrating example processing carried out by the biometric-information processing device 100 through the execution of the biometric-information processing program. As illustrated in FIG. 6, the image acquisition unit 106 acquires an image containing a user's palm. In Operation S1, the palm-region detection unit 10 detects a palm region in an acquired image (Operation S2). Then, the palm-region detection unit 10 acquires a palm region image based on the palm region detected in Operation S2 and calculates the palm region area (Operation S3).

The high-pass filter 31 extracts high-frequency components from the palm region image (Operation S4). Then, the binarizing unit 32 binarizes the high-frequency components extracted in Operation S4 to acquire a reflection detection image (Operation S5). The reflection-amount determining unit 20 calculates a reflection detection area on the basis of the palm region area acquired in Operation S3 and the reflection detection image acquired in Operation S5 (Operation S6). The reflection-amount determining unit 20 calculates a surface reflection amount on the basis of the reflection detection area acquired in Operation S6 and the palm region area acquired in Operation S3 (Operation S7).

The reflection-amount determining unit 20 determines whether the surface reflection amount acquired in Operation S7 exceeds a threshold (Operation S8). When it is determined that the surface reflection amount exceeds the threshold (YES in Operation S8), the display device 104 displays a warning message (Operation S9). After carrying out Operation S9, the process of the flow chart illustrated in FIG. 6 ends. When it is determined that the surface reflection amount does not exceed the threshold (NO in Operation S8), the smoothing unit 41 smoothens the reflection detection image acquired in Operation S5 (Operation S10).

The multiplying unit 42 multiplies the smoothened image acquired in Operation S10 by a predetermined value to adjust the brightness of the smoothened image. In this way, a reflection region image is acquired (Operation S11). The image processing unit 50 subtracts the reflection region image acquired in Operation S11 from the palm region image acquired in Operation S3 to acquire a palm image for authentication (Operation S12). The authentication processing unit 60 carries out authentication using the palm image acquired in Operation S12 (Operation S13). After carrying out Operation S13, the process of the flow chart illustrated in FIG. 6 ends.

According to this embodiment, since the image is corrected using the high-frequency components extracted by the high-pass filter 31, authentication accuracy is improved. Moreover, since the high-frequency components are binarized by the binarizing unit 32, the surface reflection components and the vein components are clearly separated. In this way, authentication accuracy is improved. Since the high-frequency components are smoothened by the smoothing unit 41, accuracy of brightness correction is increased. In this way, authentication accuracy is improved. Since the brightness of the reflection detection image is adjusted by the multiplying unit 42, the accuracy of brightness correction is even more increased. In this way, authentication accuracy is improved. Since expensive devices are not used, costs may be suppressed. Since large devices are not used, the size of the biometric-information processing device may be reduced.

In this embodiment, the binarizing unit 32, the smoothing unit 41, the multiplying unit 42, and the image processing unit 50 function as a processing unit that processes a biometric image using the frequency components extracted by the high-pass filter 31. The binarizing unit 32, the smoothing unit 41, the multiplying unit 42, and the image processing unit 50 function as a processing unit that corrects brightness of a biometric image using the frequency components extracted by the high-pass filter 31. The smoothing unit 41, the multiplying unit 42, and the image processing unit 50 function as a processing unit that corrects brightness of a biometric image using the binarized frequency components extracted by the high-pass filter 31. The multiplying unit 42 and the image processing unit 50 function as a processing unit that corrects brightness of a biometric image using binarized and smoothened frequency components extracted by the high-pass filter 31. The image processing unit 50 functions as a processing unit for correcting brightness of a biometric image using the binarized, smoothened, and multiplied frequency components extracted by the high-pass filter 31.

Figure 7:
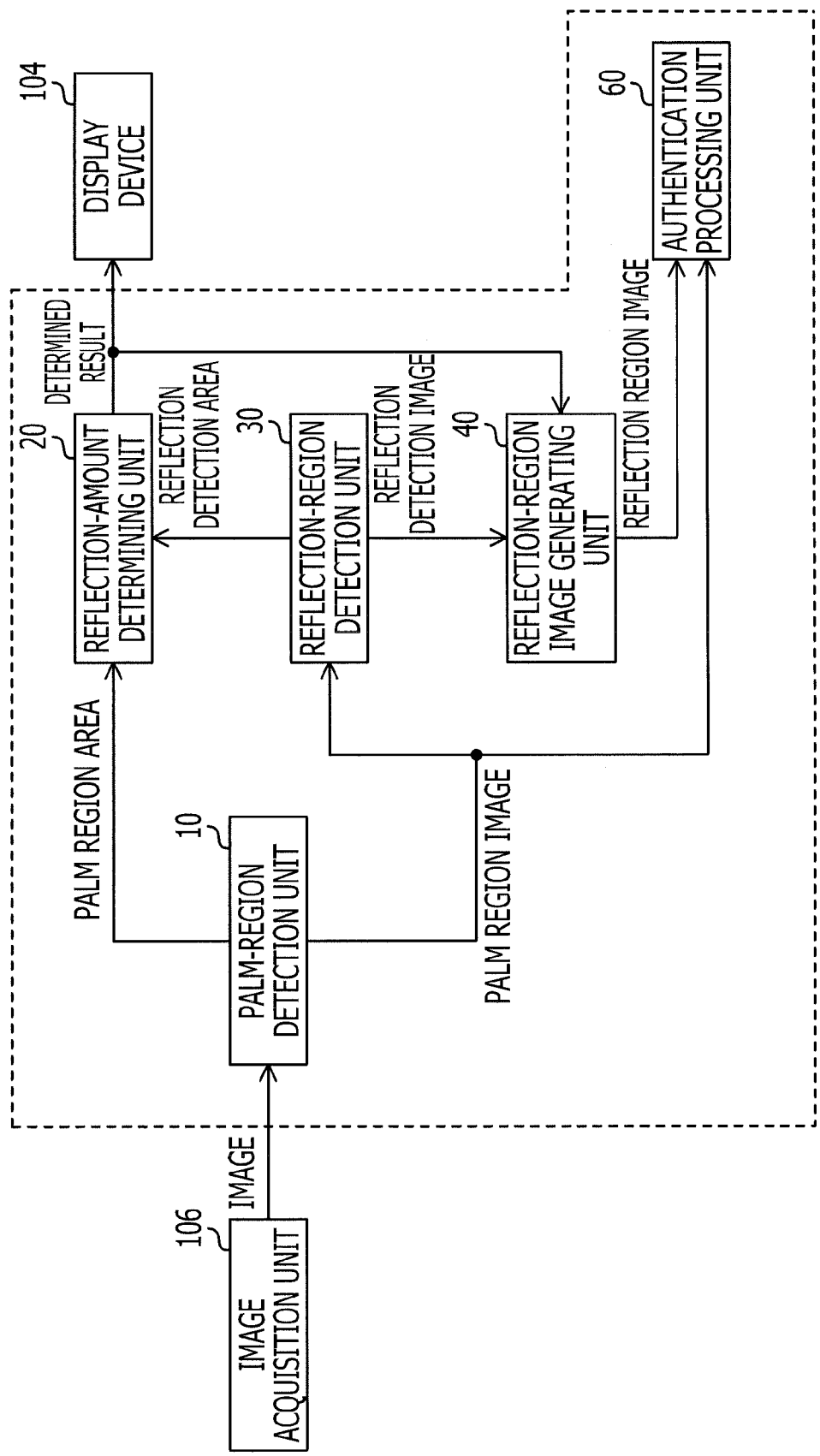
FIG. 7 is a functional block diagram of a biometric-information processing device according to a second embodiment.

A second embodiment will be described below. FIG. 7 is a functional block diagram of a biometric-information processing device 100a according to the second embodiment. The functions illustrated in FIG. 7 are realized by the execution of a biometric-information processing program according to the second embodiment. As illustrated in FIG. 7, the biometric-information processing device 100a differs from the biometric-information processing device 100, which is illustrated in FIG. 2A, in that the image processing unit 50 is not provided. In the biometric-information processing device 100a, a reflection region image generated by the biometric-information-processing unit 40 and a palm region image detected by the palm-region detection unit 10 are sent to the authentication processing unit 60.

The values of the reflection region image (brightness, etc.) are large when many surface reflection components are detected. Since the reliability of vein information is low in areas in which the surface reflection components are dominant, the influence of reflection on verification may be reduced by carrying out verification with reduced weight on these areas. Accordingly, in this embodiment, the authentication processing unit 60 carries out verification after reducing the weight on the extracted vein information in accordance with the values of the reflection region image.

Figure 8:
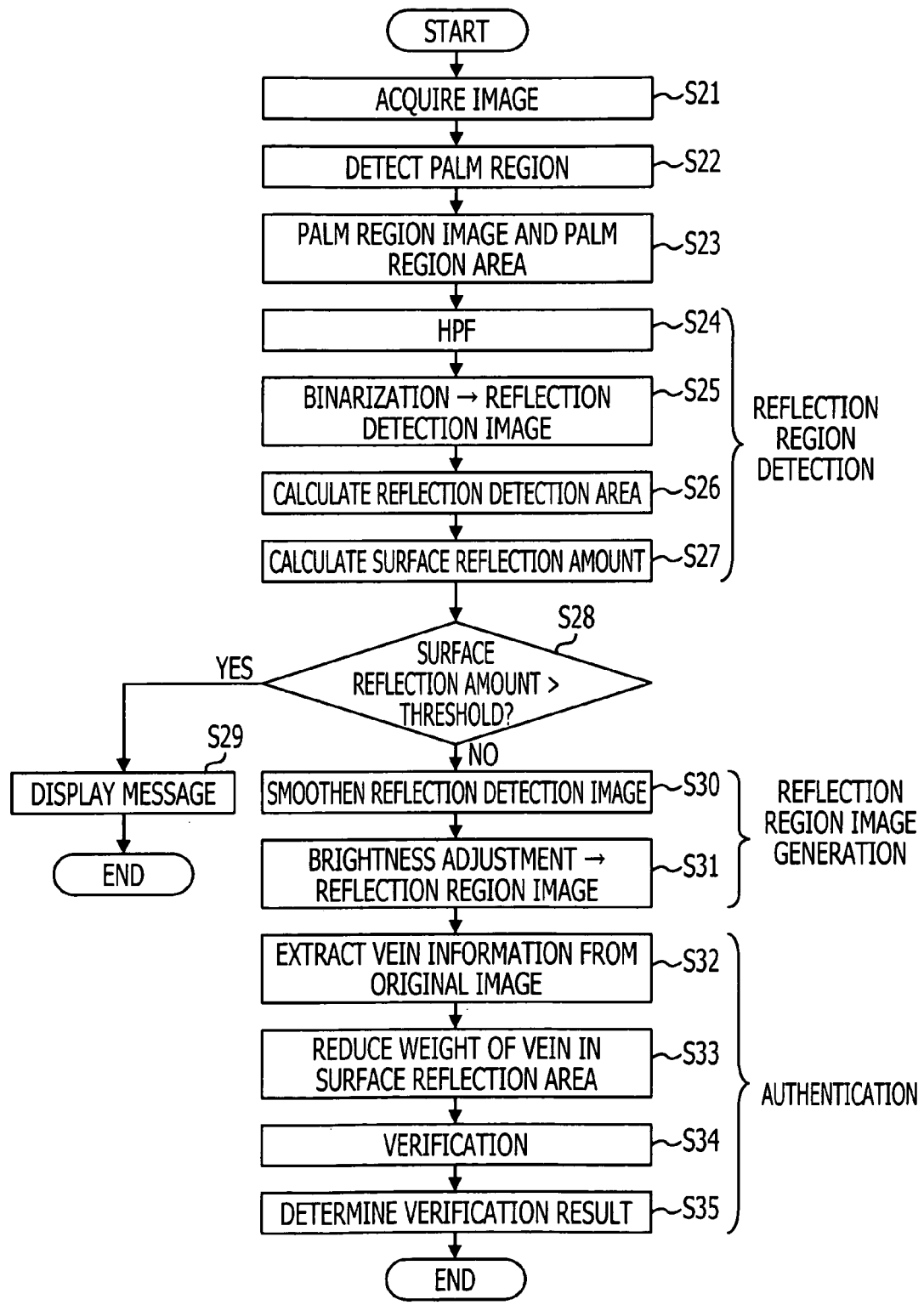
FIG. 8 is a flow chart illustrating example processing carried out by executing the biometric-information processing program of the second embodiment.

FIG. 8 is a flow chart illustrating example processing carried out by the biometric-information processing device 100a through the execution of the biometric-information processing program of the second embodiment. As illustrated in FIG. 8, Operations S21 to S31 are the same as Operations S1 to S11 in FIG. 6. After carrying out Operation S31, the authentication processing unit 60 extracts vein information from the palm region image (Operation S32).

Then, the authentication processing unit 60 reduces the weight on the vein information corresponding to the areas in which the dominance of the surface reflection exceeds a predetermined value (Operation S33). The authentication processing unit 60 carries out verification using the image acquired in Operation S33 (Operation S34). Then, the authentication processing unit 60 determines the verification result (Operation S35). After carrying out Operation S35, the process illustrated in the flow chart in FIG. 8 ends.

According to this embodiment, the influence of vein information with low reliability is reduced. In this way, authentication accuracy is improved. Since expensive devices are not used, costs may be suppressed. Moreover, since large devices are not used, the size of the biometric-information processing device may be reduced.

Figure 9:
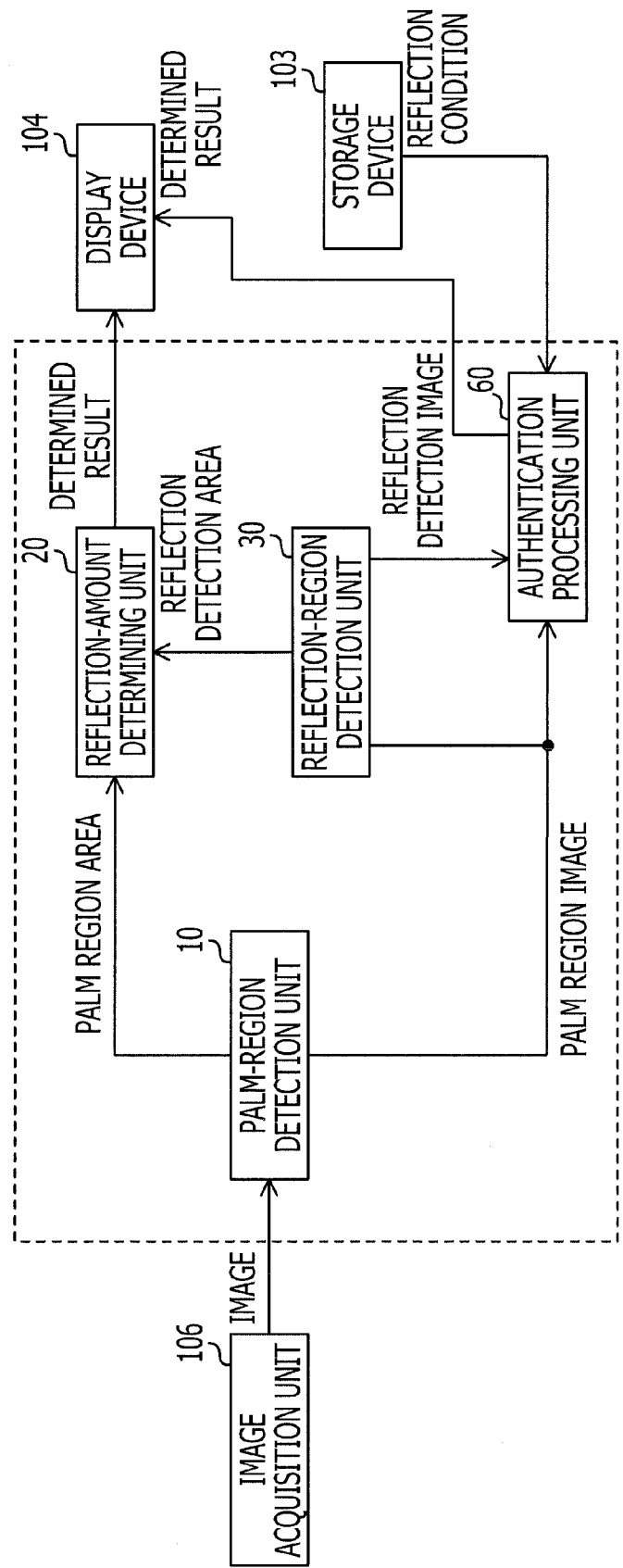
FIG. 9A is a functional block diagram of a biometric-information processing device according to a third embodiment.
FIG. 9B illustrates a registry database.

A third embodiment will be described below. FIG. 9A is a functional block diagram of a biometric-information processing device 100b according to the third embodiment. The functions illustrated in FIG. 9A are realized by the execution of a biometric-information processing program according to the third embodiment. As illustrated in FIG. 9A, the biometric-information processing device 100b differs from the biometric-information processing device 100, which is illustrated in FIG. 2A, in that the biometric-information-processing unit 40 and the image processing unit 50 are not provided. In the palm-region detection unit 100b, a reflection detection image detected by the reflection-region detection unit 30 and a palm region image detected by the palm-region detection unit 10 are sent to the authentication processing unit 60.

The storage device 103 according to this embodiment has a registry database containing reflection conditions corresponding to the time biometric data was registered or corresponding to the last time authentication has been carried out. FIG. 9B illustrates the registry database as a table. As illustrated in FIG. 9B, reflection conditions corresponding to the time biometric data was registered or corresponding to the last time authentication has been carried out are linked to user IDs, etc. and are registered in the registry database. A reflection condition is an index value of surface reflection components and contains information about regions in which surface reflection components are detected, the dominance of the surface reflection components, etc. Reflection conditions may be acquired from high-frequency components extracted by the high-pass filter 31. The authentication processing unit 60 compares a reflection condition in the registry database with the current reflection condition.

The reflection condition depends on the surface condition, the shape of the palm, etc. of the user's palm. Thus, a significant difference in reflection conditions may be a result of, for example, performing authentication on someone who is not registered in the database or a change in the surface condition of the palm. A change in the surface condition of the palm may be caused by, for example, a wet palm or an oiled palm. Hence, in this embodiment, the authentication processing unit 60 determines whether the difference between the current reflection condition and the reflection condition registered in the registry database (reflection condition difference) is large. If the reflection condition difference is large, the display device 104 may display a message notifying the user that authentication has failed or instructing the user to wipe his or her palm, and authentication by the authentication processing unit 60 may be stopped.

Figure 10:
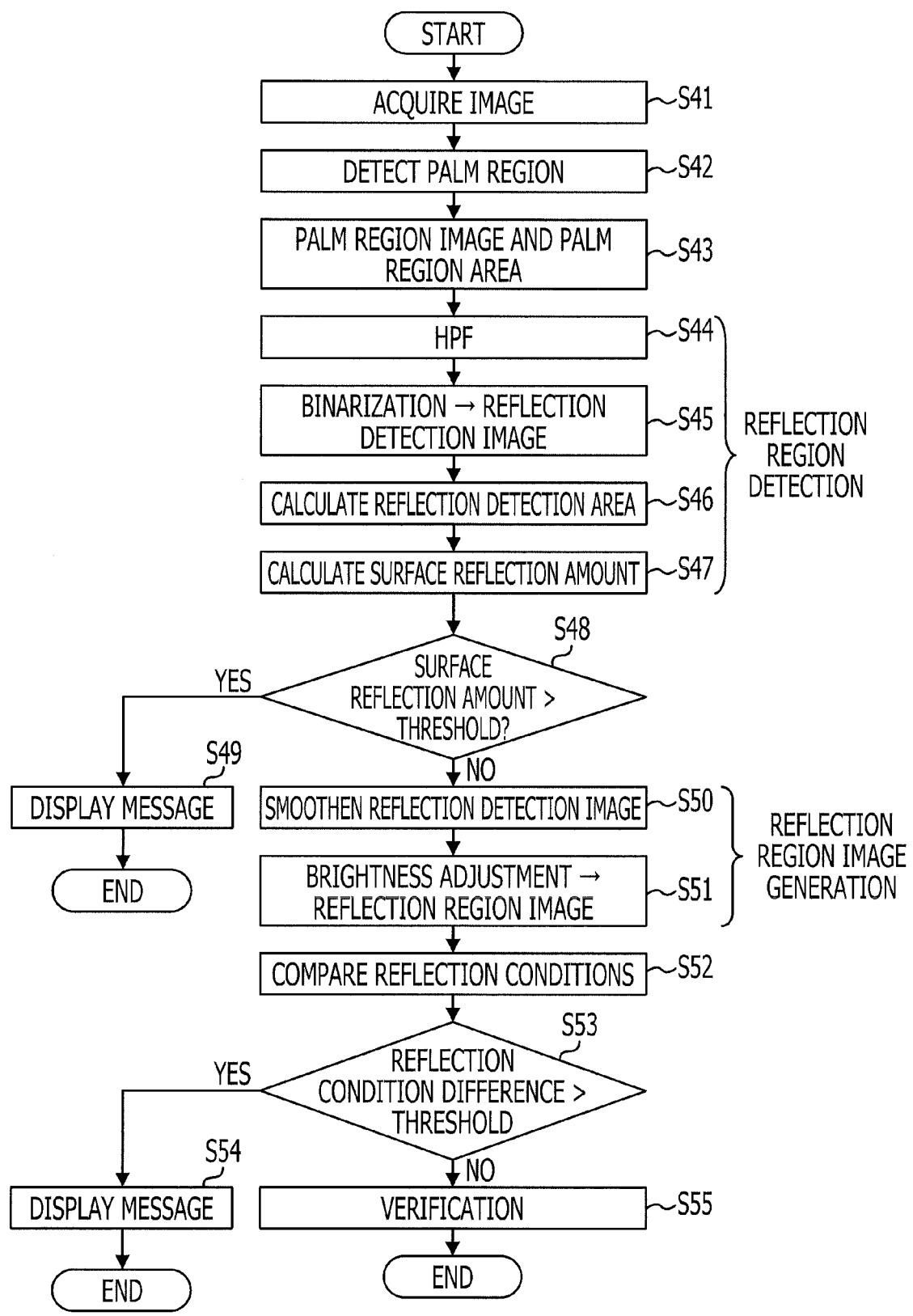
FIG. 10 is a flow chart illustrating example processing carried out by executing the biometric-information processing program of the third embodiment.

FIG. 10 is a flow chart illustrating example processing carried out by the biometric-information processing device 100b through the execution of the biometric-information processing program of the third embodiment. As illustrated in FIG. 10, Operations S41 to S51 are the same as Operations S1 to S11 in FIG. 6. After carrying out Operation S51, the authentication processing unit 60 compares a reflection condition recorded in the registry database and a current reflection condition corresponding to the flow chart in FIG. 10 (Operation S52).

Next, the authentication processing unit 60 determines whether the reflection condition difference exceeds a threshold (Operation S53). When the reflection condition difference exceeds the threshold (YES in Operation S53), the display device 104 displays a warning message and the authentication processing unit 60 stops performing authentication (Operation S54). Then, the process illustrated in the flow chart in FIG. 10 ends. When the reflection condition difference does not exceed the threshold (NO in Operation S53), the authentication processing unit 60 carries out verification using the palm region image acquired in Operation S43 (Operation S55). After carrying out Operation S55, the process illustrated in the flow chart in FIG. 10 ends. The reflection condition registered in the registry database may be updated to the current reflection condition corresponding to the period in which the process illustrated in the flow chart in FIG. 10 is carried out.

According to this embodiment, by comparing the previous reflection condition and the current reflection condition, authentication may be ended before verification. In this way, false authentication is less likely to occur. As a result, authentication accuracy may be improved. Since expensive devices are not used, costs may be suppressed. Since large devices are not used, the size of the biometric-information processing device may be reduced.

In the above-described embodiments, vein authentication in which a vein is a target biometric object is carried out. Instead, however, other forms of authentication targeting other biometric objects may be carried out. The above-described embodiments are particularly advantageous in objects having unevenness in the surface structure. Thus, it is particularly advantageous to employ the above-described embodiments in palm veins. In the above-described embodiments, illumination is provided. However, the above-described embodiments are not limited thereto. For example, illumination may not be provided if the biometric-information processing device is in an environment in which the biometric object is irradiated with external light. Authentication may be one-to-one authentication in which specific user registry data and verification data are matched or may be one-to-many authentication in which registry data of multiple users and verification data are matched. Instead of the units realized by the execution of programs, special devices which are established without the execution of programs may be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric-information processing device comprising:
   a sensor configured to acquire an image of a biometric object using light reflected from the biometric object; and
   a processor configured to extract a frequency component having a frequency higher than a predetermined spatial frequency at the image,
   wherein the processor is further configured to carry out authentication processing using the image acquired by the sensor to determine a first index value of a surface reflection component of the biometric object from the frequency component extracted by the processor and to determine whether the authentication processing is to be carried out on the basis of the first index value, and
   wherein the frequency component is extracted from a light reflected at a surface of the biometric object, and is separated from another light reflected at a vein in the biometric object.

2. The biometric-information processing device according to claim 1, wherein the processor is further configured to process the image using the frequency component.

3. The biometric-information processing device according to claim 2, wherein the processor corrects brightness of the image using the frequency component extracted by the processor.

4. The biometric-information processing device according to claim 3, wherein the processor corrects brightness of the image using the frequency component extracted by the processor, the frequency component being binarized.

5. The biometric-information processing device according to claim 4, wherein the processor corrects brightness of the image using the frequency component extracted by the processor, the frequency component being binarized and smoothened.

6. The biometric-information processing device according to claim 5, wherein the processor corrects brightness of the image using the frequency component extracted by the processor, the frequency component being binarized, smoothened, and multiplied by a predetermined value.

7. The biometric-information processing device according to claim 1, wherein the processor determines whether the authentication processing is to be carried out on the basis of a difference between the first index value and a registered index value.

8. The biometric-information processing device according to claim 7, wherein the processor updates the registered index value to the first index value.

9. The biometric-information processing device according to claim 1,
   wherein the processor determines a weight to be added to vein information on the basis of the frequency component extracted by the processor and carries out the authentication processing using the weight.

10. A method of processing biometric information comprising:
- acquiring an image of a biometric object using light reflected at the biometric object;
- extracting, by a processor, a frequency component having a frequency higher than a predetermined spatial frequency from the image acquired in the acquiring;
- carrying out an authentication process using the acquired image;
- determining a first index value of a surface reflection component of the biometric object from the frequency component extracted by the processor; and
- determining whether the authentication processing is to be carried out on the basis of the first index value,
- wherein the frequency component is extracted from a light reflected at a surface of the biometric object, and is separated from another light reflected at a vein in the biometric object.

11. The method of processing biometric information according to claim 10, further comprising:
- processing the image using the frequency component extracted in the extracting.

12. The method of processing biometric information according to claim 11,
- wherein, in the processing, brightness of the image is corrected using the frequency component extracted in the extracting.

13. The method of processing biometric information according to claim 12,
- wherein, in the processing, brightness of the image is corrected using the frequency component extracted in the extracting, the frequency component being binarized.

14. The method of processing biometric information according to claim 13,
- wherein, in processing, brightness of the image is corrected using the frequency component extracted by the extracting unit, the frequency component being binarized and smoothened.

15. The method of processing biometric information according to claim 14,
- wherein, in processing, brightness of the image is corrected using the frequency component extracted by the extracting unit, the frequency component being binarized, smoothened, and multiplied by a predetermined value.

16. A computer-readable storage medium storing a biometric-information processing program that causes a computer to execute a process comprising:
- acquiring an image of a biometric object using light reflected from the biometric object;
- extracting frequency component having a frequency higher than a predetermined spatial frequency from the image acquired by the image acquisition unit;
- carrying out an authentication process using the acquired image;
- determining a first index value of a surface reflection component of the biometric object from the frequency component extracted by the processor; and
- determining whether the authentication processing is to be carried out on the basis of the first index value,
- wherein the frequency component is extracted from a light reflected at a surface of the biometric object, and is separated from another light reflected at a vein in the biometric object.

* * * * *